(12) United States Patent
    Patry

(10) Patent No.: US 10,718,573 B2
(45) Date of Patent: Jul. 21, 2020

(54) ABSORPTION BODY FOR A CAPSULE CONTAINING A PHASE-CHANGE MATERIAL

(71) Applicant: CRYOGEL, Paris (FR)

(72) Inventor: Jean Patry, Paris (FR)

(73) Assignee: CRYOGEL, Paris (FR)

( * ) Notice: Subject to any disclaimer, the term of this patent is extended or adjusted under 35 U.S.C. 154(b) by 506 days.

(21) Appl. No.: 15/113,630

(22) PCT Filed: Jan. 16, 2015

(86) PCT No.: PCT/EP2015/050757
§ 371 (c)(1),
(2) Date: Jul. 22, 2016

(87) PCT Pub. No.: WO2015/113837
PCT Pub. Date: Aug. 6, 2015

(65) Prior Publication Data
US 2017/0003084 A1    Jan. 5, 2017

(30) Foreign Application Priority Data
Jan. 29, 2014 (FR) .................................... 14 50708

(51) Int. Cl.
| | | |
|---|---|---|
| F28D 17/00 | (2006.01) | |
| B60H 1/00 | (2006.01) | |
| F28D 20/02 | (2006.01) | |
| F28F 19/00 | (2006.01) | |
| F28F 27/00 | (2006.01) | |

(52) U.S. Cl.
CPC .......... *F28D 20/023* (2013.01); *F28F 19/002* (2013.01); *F28F 27/00* (2013.01); *F28F 2265/14* (2013.01); *Y02E 60/145* (2013.01)

(58) Field of Classification Search
CPC .... F28D 20/025; F28D 20/023; F28D 20/028; F25D 2303/082
USPC .................................................. 165/10, 11.1
See application file for complete search history.

(56) References Cited

U.S. PATENT DOCUMENTS 4,793,402 A * 12/1988 Yano ...................... C09K 5/063
                                                                126/400
4,931,333 A    6/1990 Henry
(Continued)

FOREIGN PATENT DOCUMENTS

| FR | 2 609 536 A1 | 7/1988 |
| FR | 2 732 453 A1 | 10/1996 |

(Continued)

OTHER PUBLICATIONS

Translation of JP0842984A entitled Translation—JP0842984A (Year: 2019).*

(Continued)

*Primary Examiner* — Paul Alvare
(74) *Attorney, Agent, or Firm* — Sughrue Mion, PLLC

(57) ABSTRACT

An oblong absorption body (1) for a capsule (10) for a refrigeration apparatus for containing a phase-change material. The body has a flexible casing (2) filled with gas at atmospheric pressure, a main portion which is generally cylindrical, a circular cross-section and ends in hemispherical end portions. Also disclosed are capsules provided with such an absorption body.

8 Claims, 2 Drawing Sheets

(56) References Cited

U.S. PATENT DOCUMENTS

| | | | |
|---|---|---|---|
| 5,211,949 A * | 5/1993 | Salyer | A01G 13/0237 |
| | | | 252/69 |
| 5,804,297 A | 9/1998 | Colvin et al. | |
| 2015/0144294 A1 * | 5/2015 | Kaufmann | F28D 20/028 |
| | | | 165/10 |

FOREIGN PATENT DOCUMENTS

| | | | |
|---|---|---|---|
| JP | 57026389 A | * | 2/1982 |
| JP | 08042984 A | * | 2/1996 |
| JP | 10153392 A | * | 6/1998 |
| JP | 2006105531 A | * | 4/2006 |
| KR | 20050089172 A | * | 9/2005 |

OTHER PUBLICATIONS

Translation of JP10153392 entitled Translation—JP10153392 (Year: 2019).*
Translation of JP57026389A entitled Translation—JP57026389A (Year: 2019).*
Translation of JP2006105531A entitled Translation—JP2006105531A (Year: 2019).*
Translation of KR20050089172 entitled Translation—KR20050089172 (Year: 2019).*
International Search Report of PCT/EP2015/050757 dated Apr. 8, 2015 [PCT/ISA/210].

* cited by examiner

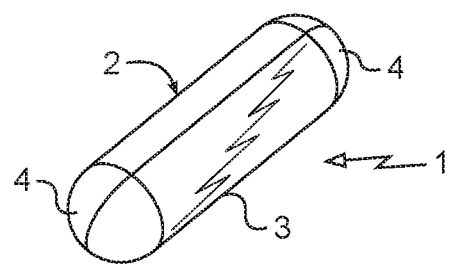
Fig. 1
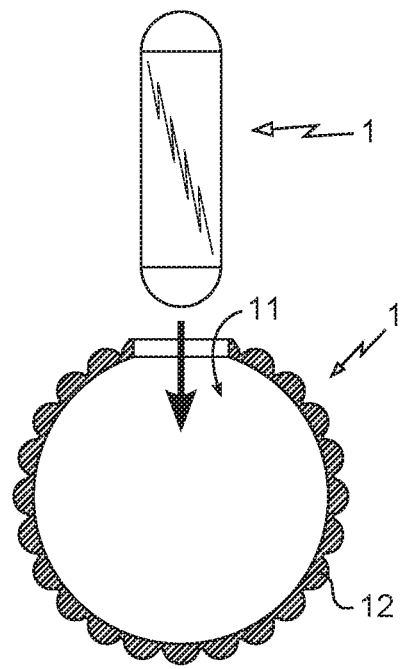
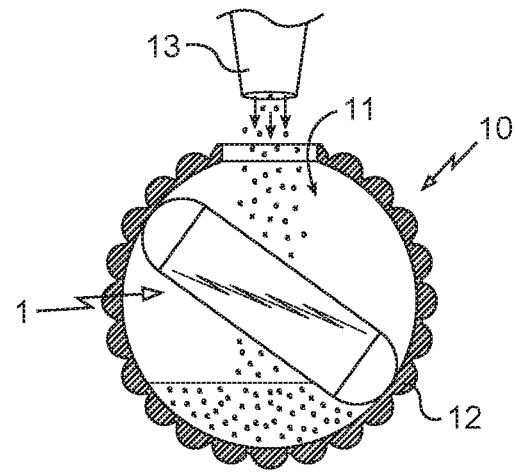
Fig. 2a　　　　Fig. 2b
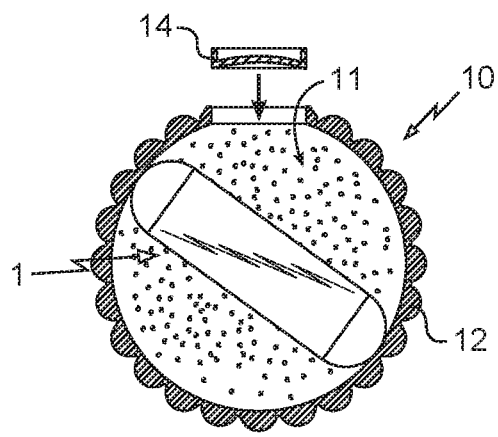　　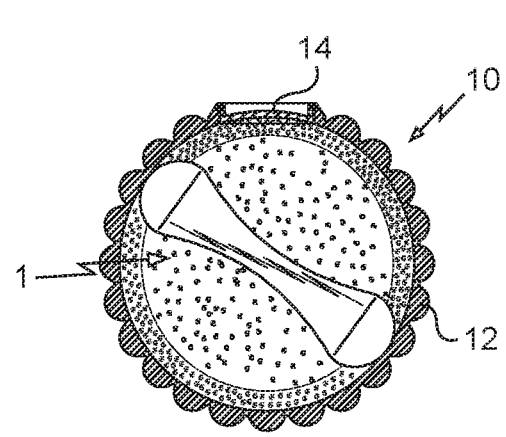
Fig. 2c　　　　Fig. 3

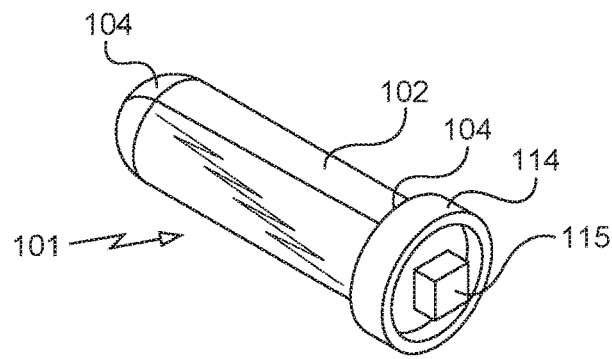
Fig. 4
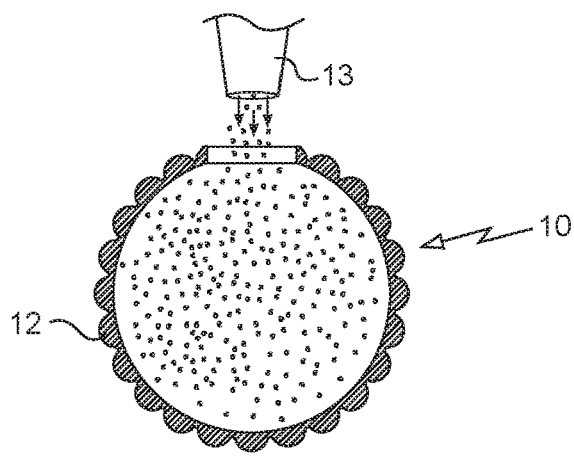
Fig. 5a
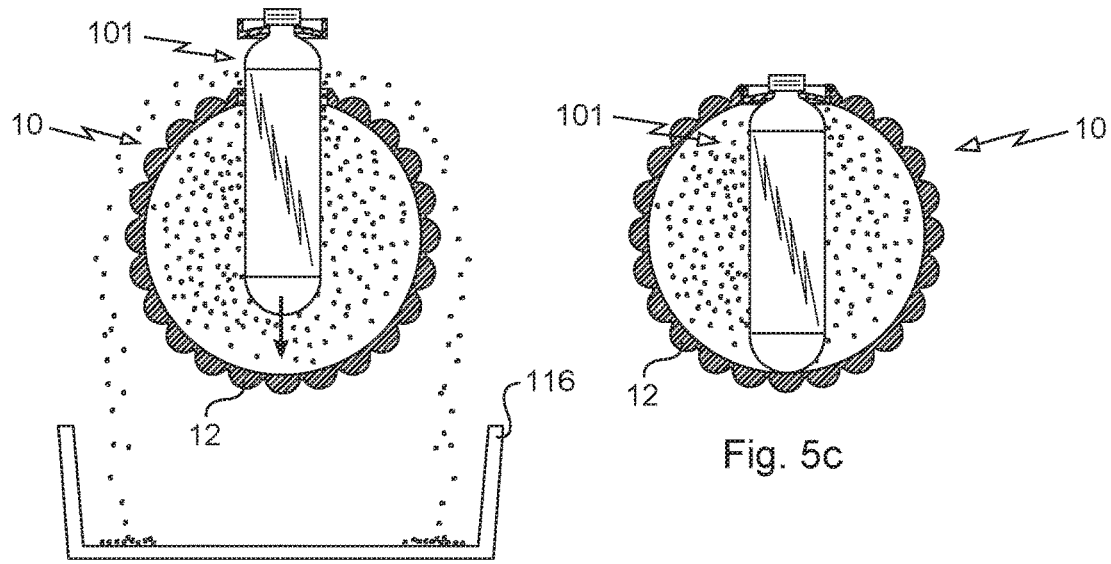
Fig. 5b
Fig. 5c

ABSORPTION BODY FOR A CAPSULE CONTAINING A PHASE-CHANGE MATERIAL

CROSS REFERENCE TO RELATED APPLICATIONS

This application is a National Stage of International Application No. PCT/EP2015/050757, filed Jan. 16, 2015, claiming priority based on French Patent Application No. 14 50708, filed Jan. 29, 2014, the contents of all of which are incorporated herein by reference in their entirety.

The present invention relates to an absorption body for a capsule (also referred to as a filler body) containing a phase-change material (abbreviated to PCM), particularly an energy-storage agent with a high latent heat of fusion/solidification such as water or utectics of hydrated salts, and to a capsule equipped with such an absorption body. The invention also relates to the way of packaging said capsule.

BACKGROUND OF THE INVENTION

Refrigeration installations comprising a closed circuit in which a heat-transfer fluid (for example glycol water) is forced to circulate between capsules filled with phase-change material and stacked in a tank (made of steel or of concrete) and then led to the zone that is to be cooled (the technology referred to as "encapsulated PCM") are known. The thinner the wall of the capsules the better the coefficient of heat transfer from the capsules to the heat-transfer fluid. During the phase referred to as the "store-charging" phase, the heat-transfer fluid, cooled by a refrigeration compressor, circulates through the tank at a temperature lower than the temperature at which the phase-change material contained in the capsules changes state and this has the effect of solidifying the phase-change material contained in the capsules and therefore of storing a certain amount of refrigeration energy. During the phase referred to as the "store discharging" phase, the heat-transfer fluid circulates through the tank and, upon contact with the capsules filled with the solidified PCM, picks up stored refrigeration energy and transfers it to the zone that is to be cooled. This circulation causes the phase-change material in the capsules to melt progressively, which means that the phase-change material has to be returned periodically to the solid state (something which is done during the store-charging phases).

Certain phase-change materials, notably water, occupy a greater volume in the solid state than in the liquid state and it is important for the capsule to be able to absorb this increase in volume without sustaining damage. One immediate solution is to partially fill the capsule with the phase-change material, the remainder of the volume being occupied by air and forming a free volume that can be gradually occupied as the phase-change material solidifies, at the expense of an increase in pressure in the capsule. Although simple to implement, this solution has the disadvantage of causing the thin wall of the capsule to stretch in a zone of weaker strength, and of allowing the casing of the capsule to deform by forming a dished shape in a zone of lesser strength of the casing under the effect of the pressure of the heat-transfer fluid.

The repeated nature of these deformations causes weakening of the casing which may ultimately yield.

Document FR2609536 describes a capsule completely filled with phase-change material and comprising a flexible casing which has hollow dished shapes that can be pushed back by the phase-change material as it solidifies, thereby allowing an increase in the internal volume of the capsule. As before, the repeated nature of the deformations of the casing ultimately weakens the latter.

Document FR2732453 itself describes a capsule with a thin and rigid casing containing a spherical absorption body held at the center of the capsule and occupying part of the internal volume of the capsule. The internal volume of the capsule, which is therefore decreased by the volume of the absorption body itself, is completely filled with phase-change material. The absorption body is compressible and therefore able to be compressed by the phase-change material as it solidifies so as to absorb the increase in volume of said material. The spherical shape of the expansion body associated with the spherical shape of the capsule leads the phase-change material to solidify from the periphery toward the center of the capsule without flowing, thereby avoiding the creation of detrimental internal stresses. However, fitting such an absorption body at the center of the capsule and keeping it there are tricky.

OBJECT OF THE INVENTION

One object of the invention is to propose an absorption body of simple shape and that is simple to employ, that can easily be used in combination with a capsule of spherical casing.

INTRODUCTION TO THE INVENTION

In order to achieve this objective, there is proposed an oblong absorption body comprising a flexible gas-filled casing with a main section of cylindrical overall shape and circular cross section ending in hemispherical ends. By giving the absorption body a length substantially equal to an internal diameter of a spherical capsule, this body naturally wedges itself in the capsule, extending along a diametral axis thereof, thereby maintaining the symmetry of revolution of the internal volume of the capsule. During a solidification phase, the phase-change material begins to solidify near the casing of the capsule, and this traps and immobilizes the ends of the absorption body and prevents it from moving around inside the capsule, thereby preventing its movements from disrupting the solidification of the phase-change material. As solidification gradually progresses, the absorption body is gradually compressed and thus frees volume to absorb the increase in volume of the phase-change material.

Also proposed is a capsule of casing of spherical overall shape equipped with the oblong absorption body of the invention, the casing of the capsule having an internal diameter substantially equal to a length of the absorption body of the invention and comprising a filling orifice of circular shape having a diameter slightly greater than a diameter of the oblong absorption body. This then makes the absorption body very much easier to place inside the capsule.

The casing of the capsule may be smooth or may have reliefs to encourage exchanges of heat between the phase-change material and the heat-transfer fluid that comes into contact with the capsules. Moreover, the expression "casing of spherical overall shape" encompasses casings the overall shape of which recalls that of a sphere, without the shape necessarily having to be strictly spherical. In particular, the casings may have hollowed shapes.

According to one aspect of the invention, the packaging of said capsule involves the steps of:

introducing the oblong absorption body into the capsule via an opening thereof;

pivoting the absorption body in order to free the opening of the capsule;

filling the capsule with phase-change material via the opening;

plugging the capsule orifice.

According to an alternative form of the invention, the oblong absorption body is associated with a pressure sensor suited to measuring the pressure of the gas enclosed in the absorption body.

BRIEF DESCRIPTION OF THE FIGURES

The invention will be better understood from the description that follows with reference to the figures of the attached drawings among which:

FIG. 1 is a perspective view of an oblong absorption body according to the invention;

FIGS. 2a to 2c are schematic figures illustrating the various steps in the packaging of a capsule according to the invention with the absorption body of FIG. 1;

FIG. 3 is a perspective view of the capsule of FIGS. 2a to 2c the phase-change material of which is in the process of solidifying upon contact with the wall of the capsule;

FIG. 4 is a perspective view of an absorption body according to an alternative form of embodiment of the invention;

FIGS. 5a to 5c are schematic figures illustrating the various steps in the packaging of a capsule according to the invention with the absorption body of FIG. 4.

DETAILED DESCRIPTION OF ONE EMBODIMENT OF THE INVENTION

FIG. 1 illustrates an absorption body 1 according to the invention which comprises a casing 2 made of flexible material. The casing 2 is of oblong shape, with a cylindrical main section 3 of circular cross section ending in hemispherical ends 4. The casing 2 is fluid-tight and contains a gas, for example air at atmospheric pressure. Its material is chosen to prevent osmotic transfers between the inside and the outside of the absorption body 1 and to exhibit good resistance to pinch. It is possible, for example, to use a material based on ethylene vinyl acetate (abbreviated to EVA). Such an absorption body may be produced by blow-molding or by any other suitable method.

Such an absorption body is used in the way illustrated in FIGS. 2a to 2c.

In the first step illustrated in FIG. 2a, the absorption body 1 is introduced into a capsule 10 via an opening 11 the diameter of which is slightly greater than a diameter of the main section 3 of the absorption body 1. Here, the casing 12 comprises reliefs on its external wall, but the overall shape of the casing 12 may exhibit any conceivable shape provided that it is spherical overall.

Next, as illustrated in FIG. 2b, the absorption body 1 is pivoted in the capsule 10 to uncover the opening 11 and make it easier to fill the capsule 10 with a phase-change material in the liquid state (illustrated as small dots) using a pouring spout 13. It will be noted that the absorption body 1 has a length substantially equal to an internal diameter of the capsule 10 so that the absorption body 1 naturally extends along a diametral axis of the capsule 10.

Finally, as illustrated in FIG. 2c, the capsule 10 is then enclosed using a plug 14. The capsule thus packaged is ready to be filled with other capsules into the tank of a cooling installation.

FIG. 3 illustrates the way in which the absorption body 1 becomes compressed as the phase-change material solidifies. Solidification begins upon contact with the casing 12 (the solidified portion is illustrated as more closely-spaced dots) and traps the ends of the absorption body 1. The main section thereof compresses as the volume of phase-change material gradually increases. The internal pressure inside the absorption body increases accordingly. Conversely, as the phase-change material melts, the absorption body applies pressure to the phase-change material and when the latter has melted sufficiently, the absorption body contributes to breaking up the residual crystals thereby increasing the surface area for liquid/solid exchange.

According to an alternative form of embodiment of the invention, which alternative form is illustrated in FIG. 4, the absorption body 101 still comprises a casing of oblong shape as previously. However, one of the ends 114 is open and able to accept a pressure sensor 115 to measure the internal pressure of the absorption body 101, for example a sensor of RFID type which can be interrogated remotely. In this instance, the sensor is arranged in practice borne by the plug 114, the absorption body being secured to said plug to form a unit assembly that can be handled easily.

Such an absorption body is used in the way illustrated in FIGS. 5a to 5c.

As illustrated in FIG. 5a, the capsule 10 is first of all filled with phase-change material in the liquid state.

Then, as illustrated in FIG. 5b, the assembly made up of the absorption body 101, of the plug 114 and of the sensor 115 is fitted onto the capsule, causing a certain quantity of phase-change material to overflow and be collected in a tray 116. FIG. 5c illustrates the capsule fully packaged and ready for use.

Typically, for a capsule with an internal diameter of 130 millimeters, an absorption body will be provided that has a length of 130 millimeters for a main-section diameter of 35 millimeters.

Typically, the diameter of the main section of the absorption body will be chosen so that when the phase-change material contained in the capsule is fully solidified, the pressure inside the absorption body is less than or equal to 3 bar.

The invention is not restricted to that which has been described, but on the contrary encompasses any alternative form that falls within the scope defined by the claims.

The invention claimed is:

1. A capsule for a refrigeration installation comprising a casing of spherical overall shape filled with phase-change material, the capsule comprising an oblong absorption body comprising a flexible gas-filled casing with a main section of cylindrical overall shape and circular cross section and at least one hemispherical end, the absorption body having a length substantially equal to an internal diameter of the casing of the capsule;

wherein the capsule further comprises a closure member secured to one end of the absorption body, the closure member removeably sealing an opening of the capsule through which the absorption body is introduced, the closure member being removable together with the absorption body.

2. The capsule as claimed in claim 1, wherein the casing of the capsule comprises an opening having a diameter greater than a diameter of the main section of the absorption body.

3. The capsule as claimed in claim 1, wherein the casing of the capsule is made from a material based on ethylene vinyl acetate.

4. The capsule as claimed in claim 1, wherein the closure member is a capsule closure plug.

5. The capsule as claimed in claim 1, wherein the absorption body comprises at one end a pressure sensor configured to measure an internal pressure of the absorption body.

6. A refrigeration installation employing capsules as claimed in claim 1.

7. A method for packaging a capsule according to claim 1, comprising the steps of: introducing the oblong absorption body into the capsule via the opening;
   filling the capsule with phase-change material via the opening and plugging the capsule with the closure member.

8. A method of packaging a capsule according to claim 1 comprising the steps of:
   filling the capsule with phase-change material via the opening;
   introducing into the capsule an assembly comprising the oblong absorption body having on one end a pressure sensor configured to measure an internal pressure of the absorption body, and sealing the capsule.

\* \* \* \* \*